United States Patent
Mueller et al.

(10) Patent No.: US 12,254,675 B2
(45) Date of Patent: Mar. 18, 2025

(54) TRAINING OF MACHINE LEARNING SYSTEMS FOR IMAGE PROCESSING

(71) Applicant: Robert Bosch GmbH, Stuttgart (DE)

(72) Inventors: Samuel Gabriel Mueller, Freiburg Im Breisgau (DE); Andre Biedenkapp, Freiburg Im Breisgau (DE); Frank Hutter, Freiburg Im Breisgau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 479 days.

(21) Appl. No.: 17/573,723

(22) Filed: Jan. 12, 2022

(65) Prior Publication Data

US 2022/0230416 A1    Jul. 21, 2022

(30) Foreign Application Priority Data

Jan. 19, 2021  (DE) ............... 10 2021 200 439.3

(51) Int. Cl.
*G06V 10/774* (2022.01)
*G06N 5/022* (2023.01)

(52) U.S. Cl.
CPC .......... *G06V 10/774* (2022.01); *G06N 5/022* (2013.01)

(58) Field of Classification Search
CPC .... G06V 10/774; G06V 10/776; G06N 3/082; G06N 20/00
See application file for complete search history.

(56) References Cited

U.S. PATENT DOCUMENTS

| | | | |
|---|---|---|---|
| 11,531,879 B1 * | 12/2022 | Teig | G06N 3/08 |
| 11,610,154 B1 * | 3/2023 | Teig | G06N 3/047 |

(Continued)

FOREIGN PATENT DOCUMENTS

| | | | | |
|---|---|---|---|---|
| WO | WO-2020057868 A1 * | 3/2020 | ........... | G05B 13/027 |

OTHER PUBLICATIONS

Finn, et al.: "Model-Agnostic Meta-Learning for Fast Adaptation of Deep Networks", International Conference on Machine Learning. PMLR, 2017, pp. 1126-1135. URL: http://proceedings.mlr.press/v70/finn17a [accessed on Jan. 13, 2022].

(Continued)

*Primary Examiner* — Chan S Park
*Assistant Examiner* — Sebastian-Sy Vuchi Ngo
(74) *Attorney, Agent, or Firm* — NORTON ROSE FULBRIGHT US LLP; Gerard A. Messina

(57) ABSTRACT

A computer-implemented method for training a machine learning system including: initializing parameters of the machine learning system and a metaparameter. Repeatedly carrying out the following as a loop: providing a batch of training data points and manipulating the provided training data points or a training method for optimizing the parameters of the machine learning system or a structure of the machine learning system based on the metaparameter. Ascertaining a cost function as a function of instantaneous parameters of the machine learning system and of the instantaneous metaparameters. Adapting the instantaneous parameters as a function of an ascertained first gradient, which has been ascertained with respect to the instantaneous parameters via the ascertained cost function for the training data points, and adapting the metaparameter as a function of a second gradient, which has been ascertained with respect to the metaparameter used in the preceding step via the ascertained cost function.

14 Claims, 8 Drawing Sheets

(56) References Cited

U.S. PATENT DOCUMENTS

| | | | |
|---|---|---|---|
| 2019/0220755 A1* | 7/2019 | Carbune | G06N 20/00 |
| 2021/0110274 A1* | 4/2021 | Tripathi | G06N 5/01 |
| 2021/0271972 A1* | 9/2021 | Groh | G05B 13/027 |
| 2021/0342974 A1* | 11/2021 | Zhang | G06T 3/4046 |
| 2022/0147767 A1* | 5/2022 | Yu | G06N 3/08 |
| 2022/0270711 A1* | 8/2022 | Feala | G16B 45/00 |
| 2023/0168150 A1* | 6/2023 | Shen | G06N 3/045 |
| | | | 73/593 |

OTHER PUBLICATIONS

Grant, et al.: "Recasting Gradient-Based Meta-Learning as Hierarchical Bayes", arXiv preprint arXiv: 1801.08930, (2018), URL: https://arxiv.org/pdf/1801.08930.pdf.

Mueller, et al.: "In-Loop Meta-Learning with Gradient-Alignment Reward", arXiv:2102.03275, (2021), pp. 1-7, URL: https://arxiv.org/pdf/2102.03275.pdf.

Luketina, Jelena, et al. "Scalable gradient-based tuning of continuous regularization hyperparameters." International conference on machine learning. 2016. Retrieved from the Internet on Jan. 12, 2022: http://proceedings.mlr.press/v48/luketina16.pdf. 9 Pages.

* cited by examiner

TRAINING OF MACHINE LEARNING SYSTEMS FOR IMAGE PROCESSING

FIELD

The present invention relates to an improved method with respect to a generalization for training a machine learning system for computer-based vision, to a training device, to a computer program and to a machine-readable memory medium.

BACKGROUND INFORMATION

In paper by Luketina, Jelena, et al. "Scalable gradient-based tuning of continuous regularization hyperparameters" International conference on machine learning. 2016 (retrievable online: arxiv.org/abs/1511.06727v1), a gradient-based approach is provided for the adaptation of hyperparameters, in which the hyperparameters are adapted in such a way that the model parameter gradients and thus the updates for the validation costs become more advantageous.

SUMMARY

Differences of the present invention over the aforementioned publication of the authors Luketina et al., include that no further data sets, in particular, validation data sets, become necessary for the training, and that also non-differentiable hyperparameters may be used.

The differences have the advantage that a training method is provided, which achieves a particularly high degree of generalization, gradients with respect to the non-differentiable hyperparameters being calculated in an efficient manner. Ultimately, a particularly generalizing and rapid training method is provided. Furthermore, the present invention is particularly data-efficient as a result of the cited differences, since no validation data are required for the training. These are usually costly to create.

In a first aspect, the present invention relates to a computer-implemented method for training a machine learning system. The machine learning system may be trained for computer-based vision, such as image processing, preferably image classifications or object detections or image segmentations. In accordance with an example embodiment of the present invention, the method includes the following steps:

initializing parameters θ of the machine learning system and of a metaparameter $\phi$. The metaparameter may be an arbitrary other parameter of the machine learning system, which is not directly used by the machine learning system, in order to process a data point using the machine learning system. "Not directly" may be understood to mean that in the case of an inference, an output variable of the machine learning system is not ascertained as a function of this parameter of the machine learning system. The metaparameter may additionally or alternatively be a parameter, which characterizes a property or behavior of the training process. Thus, it is possible that the metaparameter characterizes, for example, a manipulation of training data, for example, augmentation, or is a drop-out rate for neurons or layers of the machine learning system or hyperparameters of a gradient descent method, which is applied for optimizing the parameters of the machine learning system, for example, a learning rate α.

This is followed by a loop via the subsequent steps, either with a predefined number of iterations t or until a convergence criterion with respect to training progress of the machine learning system is met.

The loop starts with a provision of a batch of training data points, in particular, which have been randomly selected from a plurality of training data points. The batch size totals, for example, at least 128 training data points, preferably at least 256 and particularly preferably at least 1024. It has been found namely that a large batch size additionally improves the convergence behavior, in particular, of metaparameters $\phi$ using the training method described herein.

This is followed by a manipulation of the provided training data points or of a training method for optimizing parameters θ of the machine learning system or of a structure of the machine learning system based on the metaparameter $\phi$. It is noted that the training data points include in each case one training input data point, as a function of which the machine learning system ascertains its output variables, and in each case encompass training output data points (AKK. Label) assigned to the training data input points. It is further noted that the structure characterizes an architecture of the machine learning system, for example, a sequence of layers or a type of connection between the layers or the neurons that are to be used.

This is followed by an ascertainment of a cost function l as a function of instantaneous parameters θ of the machine learning system and of instantaneous metaparameter $\phi$, the cost function characterizing a deviation between ascertained output variables of the machine learning system and training output variables.

The cost function is preferably ascertained individually for the training data points in the batch.

This is followed by an adaptation of instantaneous parameters $\theta_t$ as a function of a first gradient $\nabla_{\theta_t} l_t$, which is ascertained with respect to the instantaneous parameters via the ascertained cost function for the training data points, in particular, of the batch, and then if the step of manipulation has been carried out more than once (t>1), the metaparameter is adapted as a function of a second gradient $\nabla_{\phi_{t-1}} l_t$, which has been ascertained with respect to the used metaparameter (immediately) preceding the loop iteration via the ascertained cost function of the instantaneous loop iteration. Thereupon, the loop is started again until the abort criterion of this loop is met.

As a result of the additional adaptation of the metaparameter as a function of the metaparameter of the previous loop iteration evaluated in the instantaneous loop iteration, the convergence of the training of the machine learning system is positively influenced, and an improved generalization is achieved.

In accordance with an example embodiment of the present invention, it is provided that the second gradient is ascertained with respect to the metaparameter used in the preceding step as a function of a scalar product $\nabla_{\theta_t} l_t \cdot \nabla_{\phi_{t-1}} l_{t-1}$ between the first gradient with respect to the instantaneous parameter via the ascertained cost function and the second gradient with respect to the preceding metaparameter via the ascertained cost function of the immediately preceding loop cycle. This has the advantage that a more efficient estimation of the second gradient is carried out.

It is further provided that the second gradient is ascertained as a function of a scalar product $r_{t,i}$ between first gradient $\nabla_\theta l(\theta_t, \phi_t)_i$ with respect to the instantaneous parameters of the machine learning system for training data points from the previous loop iteration and a gradient $\nabla_\theta L(\theta t)$ with respect to the instantaneous parameter of the machine learning system of an averaged sum via the cost functions of the training data points of the selected batch, the scalar product serving as weighting of the second gradient.

This has the advantage that a particularly efficient estimation of the second gradient takes place and the method is also applicable for non-differentiable metaparameters, and in particular, for stochastic gradient descent methods.

It is further provided that the first gradient is ascertained with respect to the instantaneous parameters of the machine learning system using a gradient descent method, in particular, a stochastic gradient descent method (SGD).

The machine learning system may be an image classifier. The image classifier assigns an input image to one or to multiple classes of a predefined classification. The input images used may, for example, be images of nominally identified products manufactured in series. The image classifier may, for example, be trained to assign the input images of one or of multiple of at least two possible classes, which represent a quality assessment of the respective product.

The term "image" includes, in principle, each distribution of pieces of information situated in a two-dimensional or multi-dimensional grid. These pieces of information may, for example, be intensity values of image pixels, which may be recorded using an arbitrary imaging modality such as, for example, using an optical camera, using an infrared camera or using ultrasound. Arbitrary other data such as, for example, audio data, radar data or LIDAR data may, however, also be translated into images and then similarly classified.

In accordance with an example embodiment of the present invention, it is further provided that the trained machine learning system, which has been trained according to the first aspect, ascertains an output variable as a function of a detected sensor variable of a sensor, as a function of which a control variable may then be ascertained, for example, with the aid of a control unit.

The control unit may be used to control an actuator of a technical system. The technical system may, for example, be an at least semi-autonomous machine, an at least semi-autonomous vehicle, a robot, a tool, an operating machine or a flying object such as a drone. The input variable may, for example, be ascertained as a function of detected sensor data and provided to the machine learning system. The sensor data may be detected by a sensor such as, for example, by a camera of the technical system or may alternatively be received from an external source.

In further aspects, the present invention relates to a device and to a computer program, each of which is configured to carry out the above method, and to a machine-readable memory medium, on which this computer program is stored.

BRIEF DESCRIPTION OF THE DRAWINGS

Specific embodiments of the present invention are explained below with reference to the figures.

DETAILED DESCRIPTION OF EXAMPLE EMBODIMENTS

Machine learning systems, in particular, neural networks, are usually trained with the aid of a so-called gradient descent method. Gradient descent methods are characterized in that parameters, in particular, weights of the machine learning system, are iteratively updated in every training step as a function of a calculated gradient. In this case, the gradients are ascertained via a derivation of a cost function l, the cost function therefore being evaluated on training data and being derived via the parameters of the machine learning system. For the usual gradient descent method, cost function $l(\theta)$ is a function of parameters $\theta$ of the machine learning system, as well as of ascertained output variables of the machine learning system and provided target output variables, in particular, labels.

Figure 1:
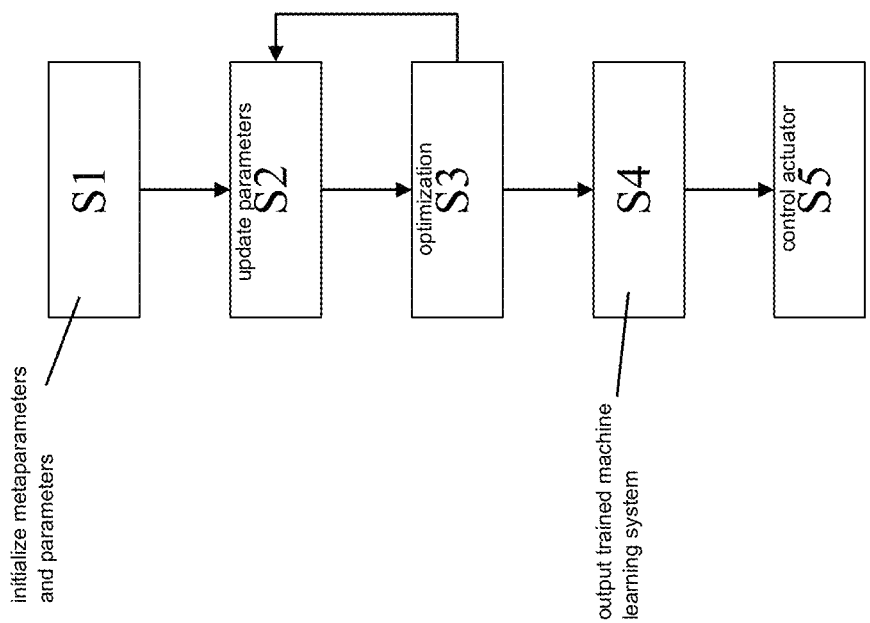
FIG. 1 schematically shows a flowchart of one specific embodiment of the present invention.

The present invention begins here in this training method with gradient descent methods and supplements this training method as explained below and as schematically represented in FIG. 1.

At start S1 of the training method, metaparameters $\phi$, in addition to parameters $\theta$ of the machine learning system, are also initialized. It is noted that here two successive metaparameters for the first training steps may be initialized: for example, $\phi_1$, $\phi_2:=\phi_1$ Metaparameter $\phi$ parameterizes, for example, a data augmentation of the training data, for example, a distribution via distortions of the images or via rotations.

Cost function $l(\theta, \phi)$ is also expanded in such a way that the cost function is now also a function of metaparameter $\phi$.

Actual training step S2 of the machine learning system, in which parameters $\theta$ are updated as a function of the gradient, remains unchanged. This means, a gradient $\nabla_\theta l(\theta, \phi)$ with respect to metaparameter $\theta$ is calculated via cost function $l(\theta, \phi)$, the cost function being evaluated using the instantaneous parameters of instantaneous iteration step t on the respective used training data: $l(\theta_t, \phi_t)$.

This is followed, in contrast to the usual training method, by an additional optimization step S3. In this step, metaparameter $\phi$ is optimized via an additional gradient descent method. For this purpose, a gradient $\nabla_{\phi_{t-1}}$ with respect to the metaparameter is calculated as a function of the cost function, for this purpose, the cost function being evaluated as a function of metaparameter $\phi_{t-1}$ used in immediately preceding training step t−1: $l(\theta_t, \phi_{t-1})$. This means, instantaneous metaparameter $\phi_t$ is updated as a function of the value of preceding metaparameter $\phi_{t-1}$.

This adaptation of the metaparameter enabled in such a way between two training iterations t−1,t effectively means that immediately preceding metaparameter $\phi_{t-1}$ used on the instantaneously used training data, which have been used for ascertaining the cost function with the instantaneous parameters of the machine learning system, is evaluated. This generates a dependency between successive steps as opposed to the usual training method. Via this further dependency, additional optimization step S3 for optimizing metaparameter $\phi_t$ results in the metaparameter being optimized in such a way that when used in the next training step, the metaparameter further minimizes the cost function. As a result, it may be said that a more rapid convergence due to the metaparameter is achieved by this newly introduced dependency, since the metaparameter advantageously influences the optimization of the cost function usually carried out.

Once metaparameter $\phi_{t+1}$ has then been set for the next training step S4: $\phi_{t-1}\zeta\phi_t-\beta\nabla_{\phi_{t-1}}l$, and the parameters of the machine learning system for the next training have also been set: $\theta_{t+1}\zeta\theta_t-\alpha\nabla_{\theta_t}l$, training steps S2 and S3 just described are carried out again, in particular, carried out multiple times in succession, until a predefined abort criterion is met. It is noted that parameters $\alpha,\beta$ represent weightings of the gradients. These parameters preferably have a value between $0 \leq \alpha, \beta < 1$.

It is noted that in the subsequent training steps before carrying out step S2, the training data are augmented in each case as a function of the set metaparameter. It has been found in experiments, however, that the augmentation of the training data has resulted in significant performance improvements only in every n-th training step. Preferably, n=2 is selected here. In one further exemplary embodiment, the gradient descent method for the machine learning system or a structure of the machine learning system may alternatively or in addition be changed after step S2 as a function of the metaparameter.

If the training has been completed by a multiple sequential repetition of step S2 and S3, step S4 may follow. Herein, the machine learning system just trained is output.

In a subsequent step S5, the output machine learning system may then be used, for example, to control an actuator. In this case, the machine learning system is able to process data provided to it and the actuator is then activated as a function of the ascertained result of the machine learning system.

In one preferred exemplary embodiment, the machine learning system is trained using images in order to classify/segment objects in the images.

In order to further improve the training method, gradient $\nabla_{\phi_{t-1}}l$ is determined using the REINFORCE trick. This measure has the advantage that with this trick, non-differentiable metaparameters $\phi$ are optimizable, for example, because the latter are not constant or because the latter are characterized by a non-constant probability distribution p.

For example, distribution p may be a function of metaparameter $\phi$ and may output a value $\alpha_i \sim p(\bullet; \phi)$ for training data point i. For example, $\alpha_i$ may characterize a value of a hyperparameter of the machine learning system (for example, dropout rate) or a training data point selection strategy. Distribution $p(\bullet; \phi)$ may, for example, be a Softmax distribution, which is parameterized by $\phi$.

For the measure just cited, a scalar product is used, which connects two successive batches of training data. The scalar product is ascertained as follows for the i-th training data point:

$$r_{t,i} = \langle \nabla_\theta l(\theta_{t-1}, \phi_t)_i, \nabla_\theta L(\theta_t) \rangle \quad \text{(Equation 2):}$$

with $l(\ )_i$ being the cost function for the i-th training data point, in particular, from the respectively considered batch of training data points containing n-th training data point, and $$L(\theta_t) = \frac{1}{n}\sum_{j=1}^{n} l(\theta_t, \phi_t)$$

being the cost function of the entire batch of immediately following step t and the scalar product $\langle , \rangle$.

It is provided that scalar product $r_{t,i}$ is to be interpreted as a reward and the REINFORCE trick is to be applied thereto. Thus, gradient $\nabla_{\phi_{t-1}}l_t$ may now be approximated as follows: (Equation 3):

$$\nabla_{\phi_{t-1}} l_t \approx \sum_{i=1}^{n} r_{t,i} \cdot \nabla_{\phi_t} \log p(a_i; \phi_t)$$

Figure 2:
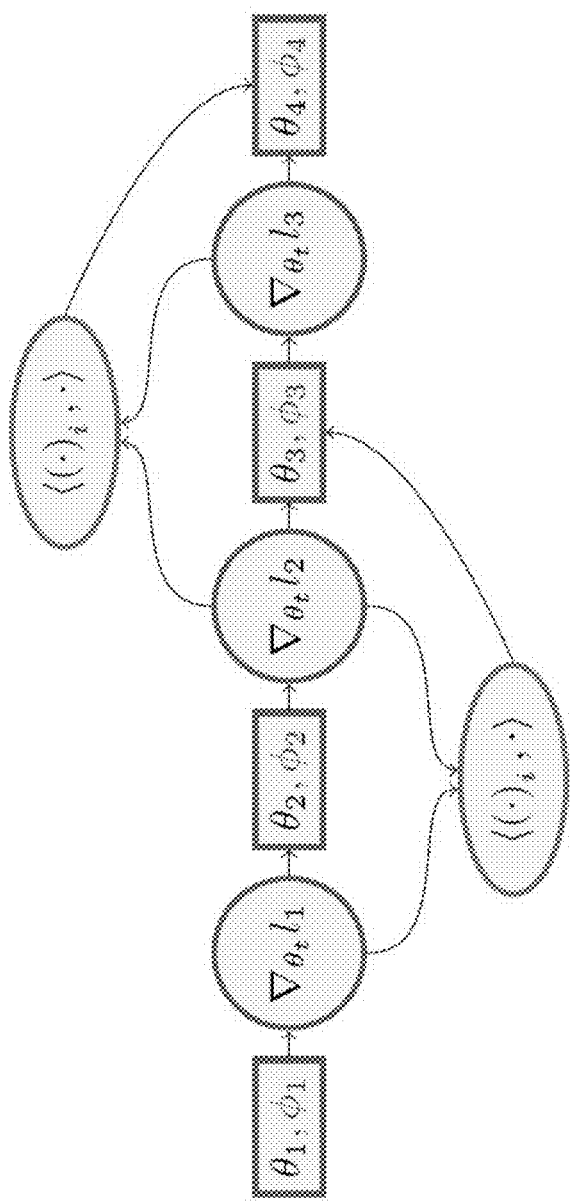
FIG. 2 schematically shows a representation of temporal dependencies when ascertaining gradients.

FIG. 2 illustrates the temporal dependencies for ascertaining Equation 2 by way of example for successive steps t=1,2, . . . ,4.

Figure 3:
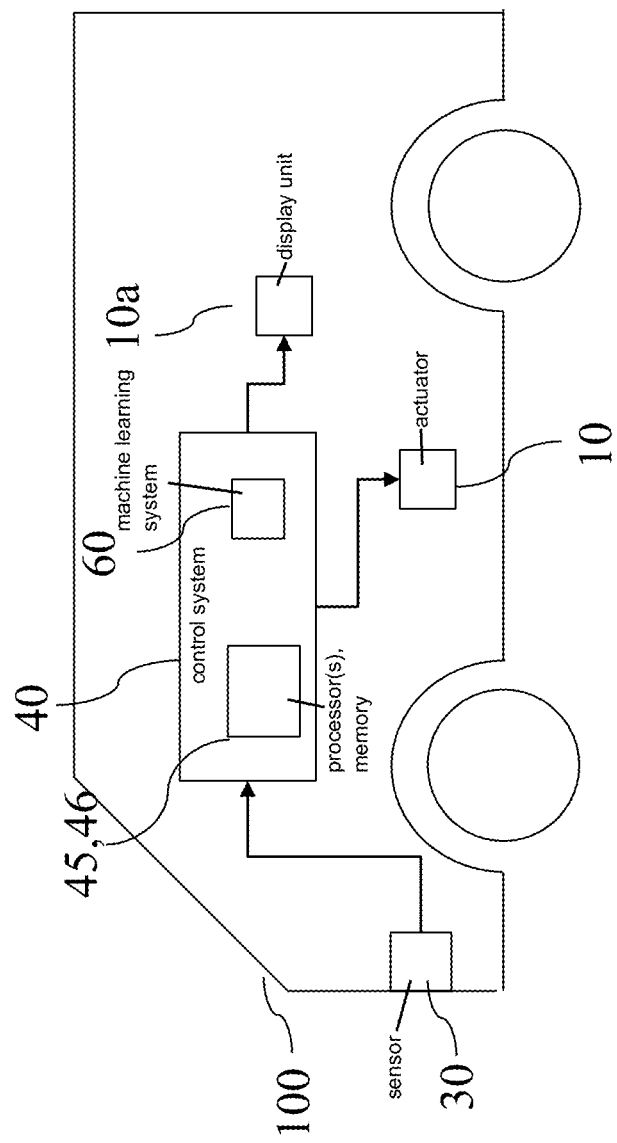
FIG. 3 schematically shows one exemplary embodiment for controlling an at least semi-autonomous robot.
Figure 4:
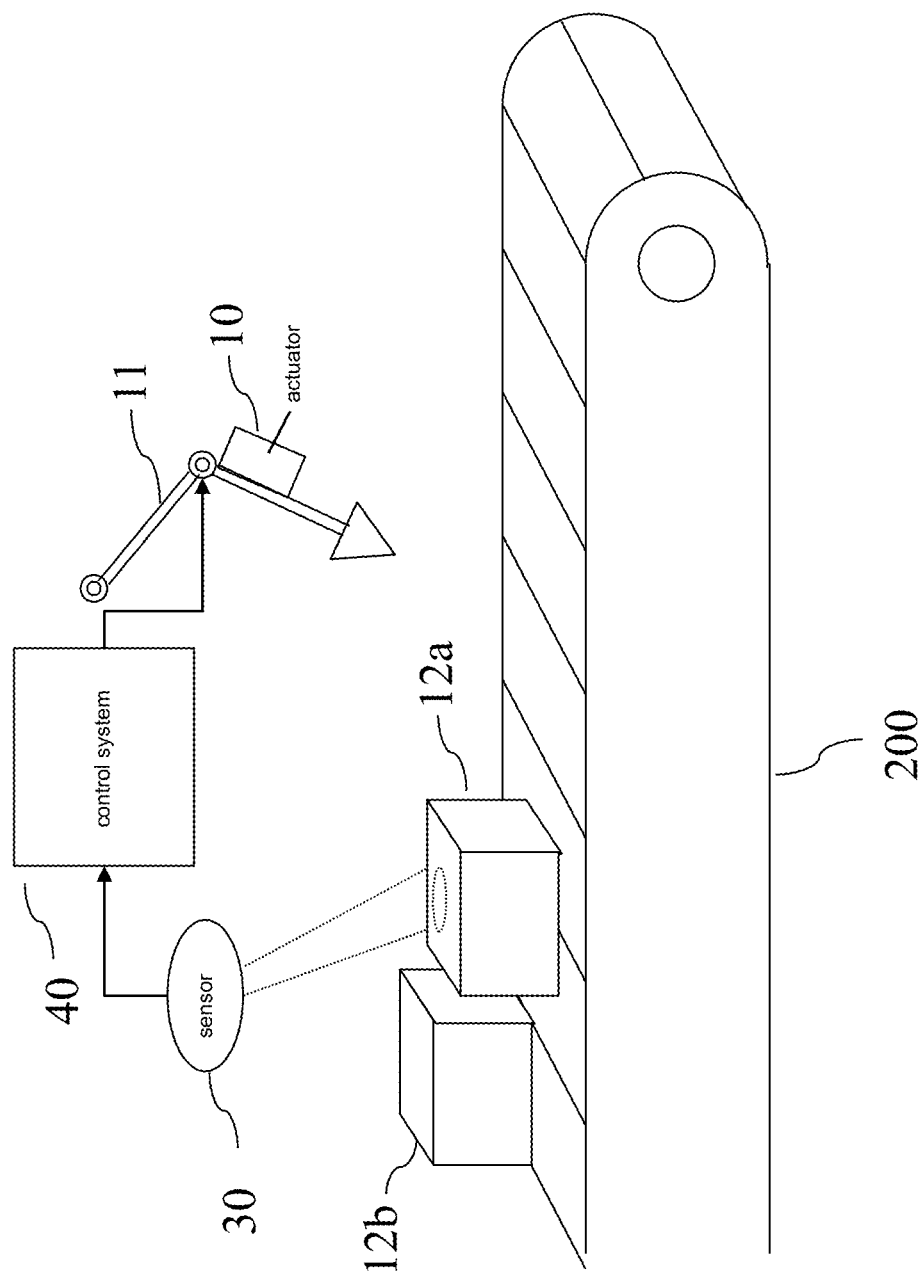
FIG. 4 schematically shows one exemplary embodiment for controlling a manufacturing system.

FIG. 3 schematically shows an actuator 10 in its surroundings in interaction with a control system 40. The surroundings are detected at preferably regular temporal intervals in a sensor 30, in particular, in an imaging sensor such as a video sensor, which may also be provided by a plurality of sensors, for example, a stereo camera. Other imaging sensors are also possible such as, for example, radar, ultrasound or LIDAR. An infrared camera is also possible. Sensor signal S—or in the case of multiple sensors one sensor signal S each—of sensor 30 is transferred to control system 40. Thus, control system 40 receives a sequence of sensor signals S. Control system 40 ascertains activation signals A therefrom, which are transferred to actuator 10.

Control system 40 receives the sequence of sensor signals S of sensor 30 in an optional receiving unit 50, which converts the sequence of sensor signals S into a sequence of input images x (alternatively, each sensor signal S may also be directly adopted as an input image x). Input image x may, for example, be a section or a further processing of sensor signal S. Input image x includes individual frames of a video recording. In other words, input image x is ascertained as a function of sensor signal S. The sequence of input images x is fed to a machine learning system, in the exemplary embodiment, the output machine learning system 60 from step S4.

Machine learning system network 60 ascertains output variables y from input images x. These output variables y may include, in particular, a classification and/or a semantic segmentation of input images x. Output variables y are fed to an optional forming unit, which ascertains therefrom activation signals A, which are fed to actuator 10 in order to activate actuator 10 accordingly. Output variable y includes pieces of information about objects detected by sensor 30.

Actuator 10 receives control signals A, is activated accordingly and carries out a corresponding action. Actuator 10 in this case may include a (not necessarily structurally integrated) control logic, which ascertains from activation signal A a second activation signal, with which actuator 10 is then activated.

In one further specific embodiment, control system 40 includes sensor 30. In still further specific embodiments, control system 40 also includes alternatively or in addition actuator 10.

In further preferred specific embodiments, control system 40 includes a single or a plurality of processors 45 and at least one machine-readable memory medium 46, on which the instructions are stored which, when they are carried out on processors 45, then prompt control system 40 to carry out the method according to the present invention.

A display unit 10*a* alternatively or in addition to actuator 10 is provided in alternative specific embodiments.

In one further exemplary embodiment, control system 40 is used for controlling an at least semi-autonomous robot, here, an at least semi-autonomous motor vehicle 100. Sensor 30 may, for example, be a video sensor situated preferably in motor vehicle 100.

Machine learning system 60 is preferably configured for the purpose of safely identifying x objects from the input images. Machine learning system 60 may be a neural network.

Actuator 10 situated preferably in motor vehicle 100 may, for example, be a brake, a drive or a steering system of motor vehicle 100. Activation signal A may then be ascertained in such a way that the actuator or actuators 10 is/are activated in such a way that motor vehicle 100 prevents, for example, a collision with objects reliably identified by artificial neural network 60, in particular, when objects of particular classes, for example, pedestrians, are involved.

Alternatively, the at least semi-autonomous robot may also be another mobile robot (not depicted), for example, one which moves by flying, floating, diving or pacing. The mobile robot may, for example, also be an at least semi-autonomous lawn mower or an at least semi-autonomous cleaning robot. In these cases as well, activation signal A may be ascertained in such a way that the drive and/or the steering system of the mobile robot is/are activated in such a way that the at least semi-autonomous robot prevents, for example, a collision with objects identified by artificial neural network 60.

Alternatively or in addition, display unit 10a may be activated with activation signal A and, for example, the ascertained safe areas may be displayed. It is also possible, for example, in a motor vehicle 100 including a non-automated steering system that display unit 10a is activated with activation signal A in such a way that it outputs a visual or acoustic warning signal when it is ascertained that motor vehicle 100 threatens to collide with one of the reliably identified objects.

FIG. 3 shows one exemplary embodiment, in which control system 40 is used for activating a manufacturing machine 11 of a manufacturing system 200 by activating an actuator 10 that controls this manufacturing machine 11. Manufacturing machine 11 may, for example, be a machine for stamping, sawing, drilling and/or cutting.

Sensor 30 may then, for example, be a visual sensor, which detects, for example, properties of manufacturing products 12a, 12b. It is possible that these manufacturing products 12a, 12b, are movable. It is possible that actuator 10 controlling manufacturing machine 11 is activated as a function of an assignment of detected manufacturing products 12a, 12b, so that manufacturing machine 11 correspondingly carries out a subsequent processing step of the correct one of manufacturing products 12a, 12b. It is also possible that by identifying the correct properties of the same one of manufacturing products 12a, 12b (i.e., without a misclassification), manufacturing machine 11 correspondingly adapts the same manufacturing step for a processing of a subsequent manufacturing product.

Figure 5:
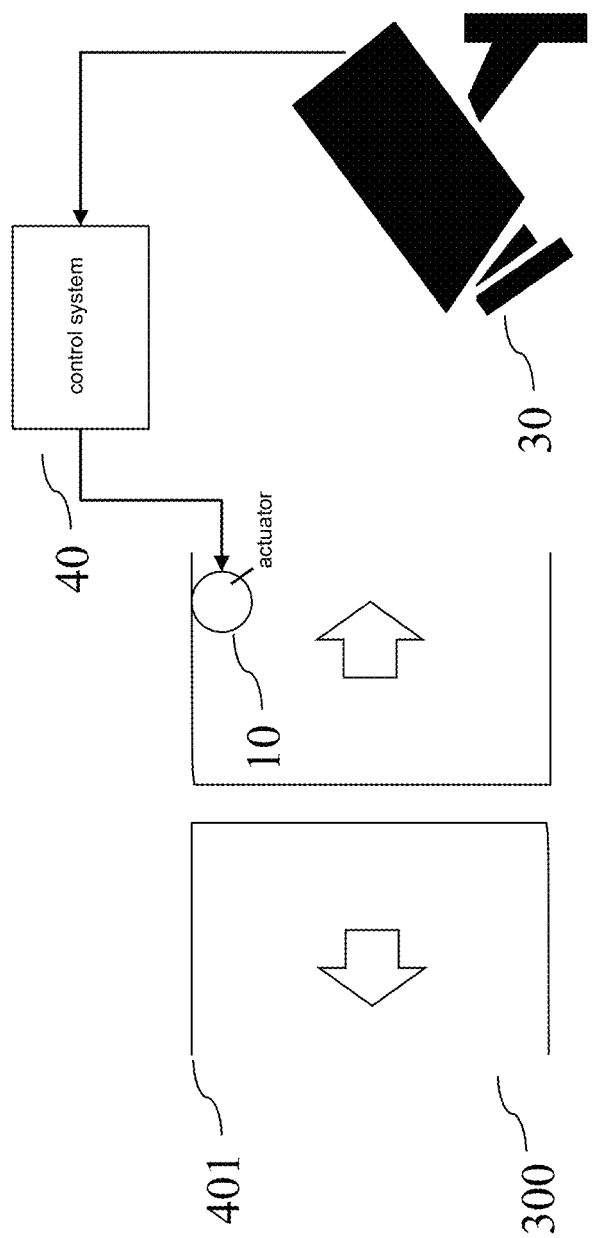
FIG. 5 schematically shows one exemplary embodiment for controlling an access system.

FIG. 5 shows one exemplary embodiment, in which control system 40 is used for controlling an access system 300. Access system 300 may include a physical access control, for example, a door 401. Video sensor 30 is configured to detect a person. This detected image may be interpreted with the aid of object identification system 60. If multiple persons are detected simultaneously, the identity of the persons, for example, may be particularly reliably ascertained by an assignment of the persons (i.e., of the objects) relative to one another, for example, by an analysis of their movements. Actuator 10 may be a lock, which blocks or does not block the access control, as a function of activation signal A, for example, opens or does not open door 401. For this purpose, activation signal A may be selected as a function of the interpretation of object identification system 60, for example, as a function of the ascertained identity of the person. Instead of the physical access control, a logical access control may also be provided.

Figure 6:
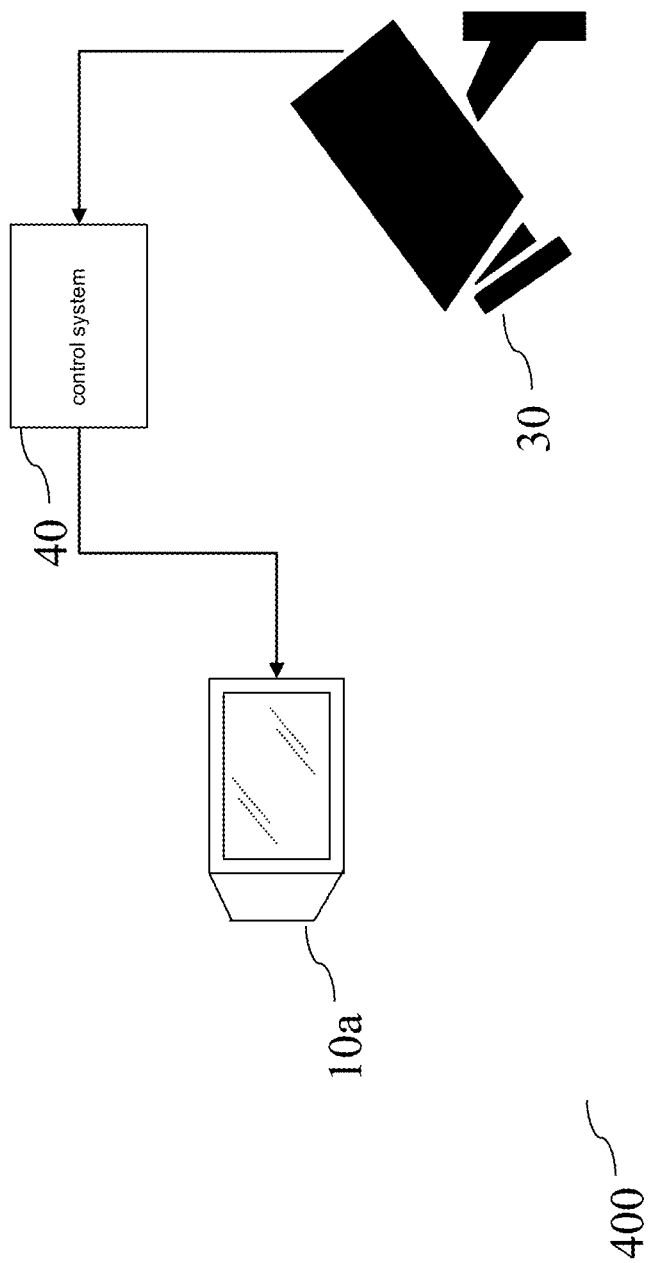
FIG. 6 schematically shows one exemplary embodiment for controlling a monitoring system.

FIG. 6 shows one exemplary embodiment, in which control system 40 is used for controlling a monitoring system 400. This exemplary embodiment differs from the exemplary embodiment shown in FIG. 5 in that instead of actuator 10, display unit 10a is provided, which is activated by control system 40. For example, an identity of the objects recorded by video sensor 30 may be reliably ascertained by artificial neural network 60 in order, for example, to deduce therefrom which become suspicious, and activation signal A is then selected in such a way that this object is displayed in a color highlighted manner by display unit 10a.

Figure 7:
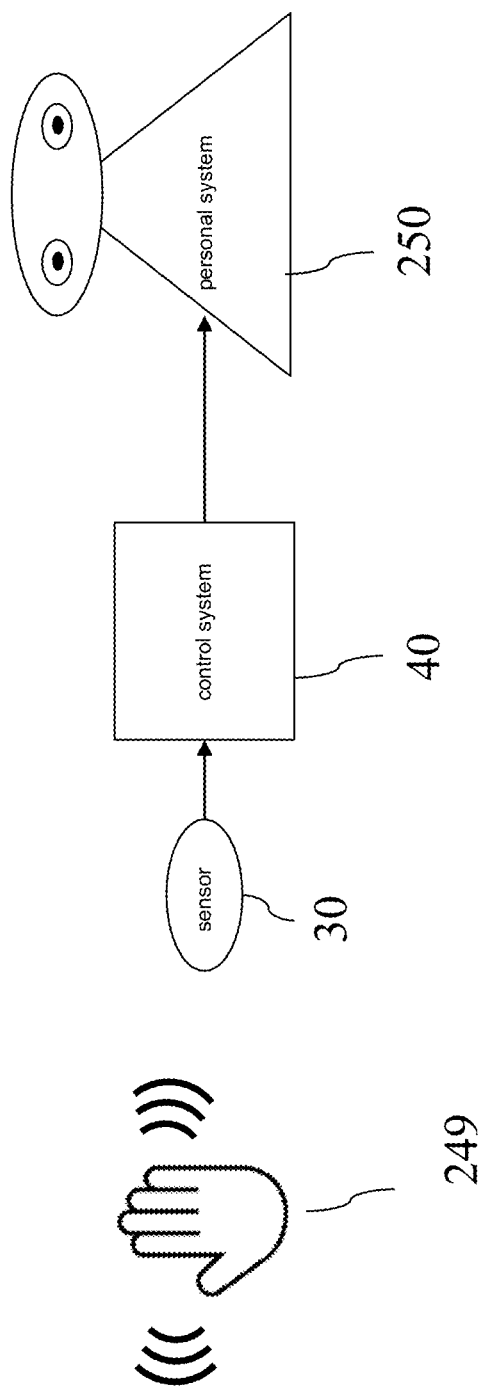
FIG. 7 schematically shows one exemplary embodiment for controlling a personal assistant.

FIG. 7 shows one exemplary embodiment, in which control system 40 is used for controlling a personal assistant 250. Sensor 30 is preferably a visual sensor, which receives images of a gesture of a user 249.

Control system 40 ascertains as a function of the signals of sensor 30 an activation signal A of personal assistant 250, for example, by the neural network carrying out a gesture recognition. This ascertained activation signal A is then conveyed to personal assistant 250 and the latter is thus activated accordingly. This ascertained activation signal A may, in particular, be selected in such a way that it corresponds to an assumed desired activation by user 249. This assumed desired activation may be ascertained as a function of the gesture recognized by artificial neural network 60. Control system 40 may then select activation signal A for conveyance to personal assistant 250 as a function of the assumed desired activation and/or may select activation signal A for conveyance to the personal assistant according to assumed desired activation 250.

This corresponding activation may, for example, include that personal assistant 250 retrieves pieces of information from a database and reproduces them in an apprehensible manner for user 249.

Instead of personal assistant 250, a household appliance (not depicted), in particular, a washing machine, a stove, an oven, a microwave or a dishwasher may also be provided in order to be activated accordingly.

Figure 8:
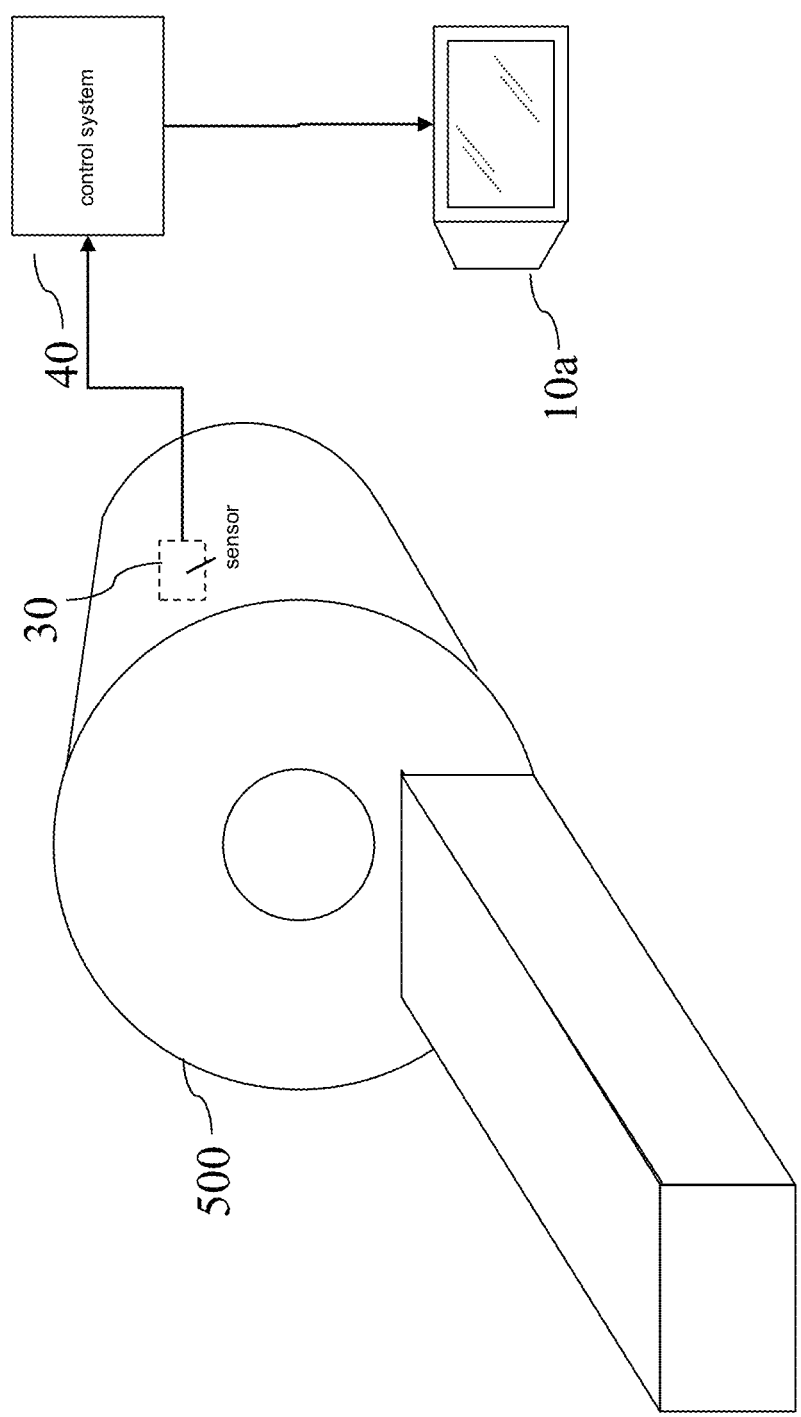
FIG. 8 schematically shows one exemplary embodiment for controlling a medical imaging system.

FIG. 8 shows one exemplary embodiment, in which control system 40 is used for controlling a medical imaging system 500, for example, an MRI, an x-ray device or an ultrasound device. Sensor 30 may, for example, be provided in the form an imaging sensor, display unit 10a being activated by control system 40. For example, it may be ascertained by neural network 60 whether an area recorded by the imaging sensor is conspicuous, and activation signal A may then be selected in such a way that this area is displayed in a color highlighted manner by display unit 10a.

What is claimed is:

1. A computer-implemented method for training a machine learning system for image processing, comprising the following steps:
   initializing parameters of the machine learning system and a metaparameter;
   repeatedly carrying out the following steps as a loop for at least four iterations of the loop:
      providing, in a current iteration of the loop, a batch of training data points, each of the training data points being a training input data as a function of which the machine learning system ascertains output variables in each case encompassing training output data points;

manipulating, in the current iteration of the loop, based on an instantaneous value of the metaparameter, (i) the provided training data points, or (ii) a training method for optimizing the parameters of the machine learning system, or (iii) a structure of the machine learning system;

ascertaining, in the current iteration of the loop, a cost function as a function of instantaneous parameters of the machine learning system and of the instantaneous value of the metaparameter;

adapting, in the current iteration of the loop, the instantaneous parameters of the machine learning system as a function of a first gradient, which has been ascertained with respect to the instantaneous parameters of the machine learning system via the ascertained cost function which was ascertained for the current iteration of the loop for the training data points provided in the current iteration of the loop; and when the step of manipulating has been carried out more than once, adapting, in the current iteration of the loop, the metaparameter as a function of a second gradient, wherein the second gradient is ascertained as a function a value of the metaparameter used in the manipulating step of an iteration of the loop immediately preceding the current iteration of the loop using the ascertained cost function which was ascertained in the current iteration of the loop.

2. The method as recited in claim 1, wherein the second gradient ascertained as a function of the value of the metaparameter used in the manipulating step of the immediately preceding iteration of the loop is ascertained via the ascertained cost function as a function of a scalar product between the first gradient with respect to the instantaneous parameters and the second gradient with respect to the value of metaparameter used in the immediately preceding iteration of the loop via the ascertained cost function of the immediately preceding iteration of the loop.

3. The method as recited in claim 1, wherein the second gradient ascertained as a function of the value of the metaparameter used in the manipulating step of the immediately preceding iteration of the loop is ascertained via the cost function of the training data points of the provided batch for a current iteration of the loop as a function of a scalar product between the first gradient with respect to the instantaneous parameters of the machine learning system used in the immediately preceding iteration of the loop for a first training data point and a third gradient with respect to the instantaneous parameters of the machine learning system of an averaged sum, the scalar product serving as weighting of the second gradient.

4. The method as recited in claim 3, wherein the second gradient is ascertained as a function of a sum via a plurality of the training data points of the batch of the training points of an instantaneous iteration of the loop over the scalar product for a plurality of the training data points of the batch if the instantaneous iteration of the loop multiplied in each case by a gradient with respect to the instantaneous value of the metaparameter via a logarithm of a distribution used for the respective first training data point for the scalar product, the distribution characterizing a probability distribution of optimal values of the metaparameter.

5. The method as recited in claim 1, wherein the first gradient with respect to the instantaneous parameters of the machine learning system is ascertained using a gradient descent method, the gradient descent method being a stochastic gradient descent method.

6. The method as recited in claim 1, wherein the manipulation of the training data is carried out as a function of the instantaneous value of the metaparameter only for each m-th loop cycle, m being a predefined number.

7. The method as recited in claim 6, wherein m<2.

8. The method as recited in claim 1, wherein the metaparameter characterizes a training data point augmentation and during manipulation of the training data points, the train data points are augmented based on the metaparameter.

9. The method as recited in claim 1, wherein the training data points are images, and the machine learning system is trained as an image classifier.

10. The method of claim 1, wherein, in the adapting of the metaparameter step, the second gradient is a gradient which has been ascertained with respect to the value of the metaparameter that was used in the manipulating and ascertaining steps in the immediately preceding iteration of the loop.

11. A device configured to train a machine learning system for image processing, the device comprising a computer and being configured to:

initialize parameters of the machine learning system and a metaparameter;

repeatedly carry out the following steps as a loop for at least four iterations of the loop:

providing, in a current iteration of the loop, a batch of training data points, each of the training data points being a training input data as a function of which the machine learning system ascertains output variables in each case encompassing training output data points;

manipulating, in the current iteration of the loop, based on an instantaneous value of the metaparameter, (i) the provided training data points, or (ii) a training method for optimizing the parameters of the machine learning system, or (iii) a structure of the machine learning system;

ascertaining, in the current iteration of the loop, a cost function as a function of instantaneous parameters of the machine learning system and of the instantaneous value of the metaparameter;

adapting, in the current iteration of the loop, the instantaneous parameters of the machine learning system as a function of a first gradient, which has been ascertained with respect to the instantaneous parameters of the machine learning system via the ascertained cost function which was ascertained for the current iteration of the loop for the training data points provided in the current iteration of the loop; and when the step of manipulating has been carried out more than once, adapting, in the current iteration of the loop, the metaparameter as a function of a second gradient, wherein the second gradient is ascertained as a function a value of the metaparameter used in the manipulating step of an iteration of the loop immediately preceding the current iteration of the loop using the ascertained cost function which was ascertained in the current iteration of the loop.

12. The device of claim 11, wherein in the adapting of the metaparameter step, the second gradient is a gradient which has been ascertained with respect to the value of the metaparameter that was used in the manipulating and ascertaining steps in the immediately preceding iteration of the loop.

13. A non-transitory machine-readable memory medium on which is stored a computer program for training a machine learning system for image processing, the computer program, when executed by a computer, causing the computer to perform the following steps:

initializing parameters of the machine learning system and a metaparameter;

repeatedly carrying out the following steps as a loop for at least four iterations of the loop:

providing, in a current iteration of the loop, a batch of training data points, each of the training data points being a training input data as a function of which the machine learning system ascertains output variables in each case encompassing training output data points;

manipulating, in the current iteration of the loop, based on an instantaneous value of the metaparameter, (i) the provided training data points, or (ii) a training method for optimizing the parameters of the machine learning system, or (iii) a structure of the machine learning system;

ascertaining, in the current iteration of the loop, a cost function as a function of instantaneous parameters of the machine learning system and of the instantaneous value of the metaparameter;

adapting, in the current iteration of the loop, the instantaneous parameters of the machine learning system as a function of a first gradient, which has been ascertained with respect to the instantaneous parameters of the machine learning system via the ascertained cost function which was ascertained for the current iteration of the loop for the training data points provided in the current iteration of the loop; and when the step of manipulating has been carried out more than once, adapting, in the current iteration of the loop, the metaparameter as a function of a second gradient, wherein the second gradient is ascertained as a function a value of the metaparameter used in the manipulating step of an iteration of the loop immediately preceding the current iteration of the loop using the ascertained cost function which was ascertained in the current iteration of the loop.

14. The non-transitory machine-readable memory medium of claim 13, wherein in the adapting of the metaparameter step, the second gradient is a gradient which has been ascertained with respect to the value of the metaparameter that was used in the manipulating and ascertaining steps in the immediately preceding iteration of the loop.

* * * * *